United States Patent
Peleg

(10) Patent No.: US 10,210,328 B2
(45) Date of Patent: *Feb. 19, 2019

(54) MITIGATION OF CODE REUSE ATTACKS BY RESTRICTED INDIRECT BRANCH INSTRUCTION

(71) Applicant: International Business Machines Corporation, Armonk, NY (US)

(72) Inventor: Nitzan Peleg, Haifa (IL)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/848,636

(22) Filed: Dec. 20, 2017

(65) Prior Publication Data
US 2019/0005231 A1 Jan. 3, 2019

Related U.S. Application Data

(63) Continuation of application No. 15/636,703, filed on Jun. 29, 2017.

(51) Int. Cl.
*G06F 9/30* (2018.01)
*G06F 21/54* (2013.01)
(Continued)

(52) U.S. Cl.
CPC ............ *G06F 21/54* (2013.01); *G06F 21/566* (2013.01); *G06F 11/3037* (2013.01);
(Continued)

(58) Field of Classification Search
None
See application file for complete search history.

(56) References Cited

U.S. PATENT DOCUMENTS 5,832,260 A * 11/1998 Arora .................. G06F 9/30058
712/239
6,397,301 B1 * 5/2002 Quach ................. G06F 12/0802
711/138
(Continued)

OTHER PUBLICATIONS

IBM, Appendix P, List of IBM Patents or Patent Applications Treated as Related, dated Jan. 18, 2018, 2 pages.
(Continued)

*Primary Examiner* — John M Lindlof
(74) *Attorney, Agent, or Firm* — Jose A. Medina-Cruz; William H. Hartwell

(57) ABSTRACT

A method, computer program product and/or system is disclosed. According to an aspect of this invention, one or more processors receive an indirect jump instruction comprising a target address offset and a maximal offset value. One or more processors determine whether the target address offset is valid by comparison of the target address offset and the maximal offset value and one or more processors execute a jump operation based on whether the target address offset is valid. In some embodiments of the present invention, the jump operation comprises one or more processors executing an instruction located at a target address referenced by the target address offset if the target address offset is valid. In some embodiments, the jump operation further comprises one or more processors raising an exception if the target address offset is not valid.

1 Claim, 4 Drawing Sheets

(51) Int. Cl.
*G06F 21/56* (2013.01)
*G06F 12/0846* (2016.01)
*G06F 11/34* (2006.01)
*G06F 21/55* (2013.01)
*G06F 11/30* (2006.01)

(52) U.S. Cl.
CPC ...... *G06F 11/3471* (2013.01); *G06F 12/0848* (2013.01); *G06F 21/554* (2013.01); *G06F 2212/452* (2013.01)

(56) References Cited

U.S. PATENT DOCUMENTS

| | | | | |
|---|---|---|---|---|
| 8,819,399 | B1* | 8/2014 | Muth | G06F 21/53 712/220 |
| 9,305,167 | B2 | 4/2016 | Lutes et al. | |
| 9,390,260 | B2 | 7/2016 | Tan et al. | |
| 2015/0278516 | A1 | 10/2015 | Caprioli | |
| 2015/0370560 | A1 | 12/2015 | Tan et al. | |
| 2016/0179546 | A1 | 6/2016 | Yamada et al. | |
| 2016/0180115 | A1 | 6/2016 | Yamada et al. | |
| 2016/0196427 | A1 | 7/2016 | Davidov et al. | |

OTHER PUBLICATIONS

Bletsch et al., "Jump-Oriented Programming: A New Class of Code-Reuse Attack", ASIACS '11, Mar. 22-24, 2011, Hong Kong, China, pp. 30-40, Copyright 2011 978-1-4503-0564-8/11/03.

Bletsch et al., "Mitigating Code-Reuse Attacks with Control-Flow Locking", ACSAC '11 Dec. 5-9, 2011, Orlando, Florida USA, pp. 353-362, Copyright 2011 ACM 978-1-4503-0672-0/11/12, <http://dl.acm.org/citation.cfm?id=2076783>.

Kayaalp et al., "Branch Regulation: Low-Overhead Protection from Code Reuse Attacks", Department of Computer Science, State University of New York at Binghamton, pp. 94-105, 978-1-4673-0476-4/12/$31,00 (c) 2012 IEEE, <http://ieeexplore.ieee.org/document/6237009/.

Pappas et al., "Transparent ROP Exploit Mitigation Using Indirect Branch Tracing", This paper is included in the Proceedings of the 22nd USENIX Security Symposium, Aug. 14-16, 2013, Washington, D.C., USA, pp. 447-462, ISBN 978-1-931971-03-4, <https://www.usenix.org/conference/usenixsecurity13/technical-sessions/paper/pappas>.

"Control-Flow-Integrity", iadgov, GitHub, 3 pages, <https://github.com/iadgov/Control-Flow-Integrity>, printed on Apr. 14, 2017.

"Control-flow Enforcement Technology Preview", Intel®, Jun. 2016, Revision 1.0, Document No. 334525-001, 136 pages.

"Return-oriented programming", From Wikipedia, the free encyclopedia, This page was last modified on Mar. 30, 2017, 4 pages, printed on Apr. 14, 2017, <https://en.wikipedia.org/wiki/Return-oriented_programming>.

Peleg, Nitzan, "Mitigation of Code Reuse Attacks by Restricted Indirect Branch Instruction", U.S. Appl. No. 15/636,703, filed Jun. 29, 2017, 31 pages.

* cited by examiner

MITIGATION OF CODE REUSE ATTACKS BY RESTRICTED INDIRECT BRANCH INSTRUCTION

BACKGROUND

The present invention relates generally to the field of computer security, and more particularly to mitigation of code reuse attacks by restriction of target addresses.

Memory corruption refers to those instances where memory locations are unintentionally modified. Memory corruption often leads to runtime errors and erratic program behavior. Memory corruption vulnerabilities may also lead to execution of arbitrary code without permission or consent of the program user.

Memory corruption vulnerabilities allow attackers to perform code reuse attacks. These types of attacks are software exploits where an attacker directs control flow of a program through existing code with malicious results. For example, return oriented programming (ROP) and jump oriented programming (JOP) techniques allow attackers to achieve arbitrary computation and behavior of a program without code injection.

In ROP, attackers overwrite the stack with return addresses and arguments, where the return addresses reference arbitrary snippets of code within the existing code base. These snippets of code (also known as gadgets), end in a return instruction to transfer control to the next gadget. In JOP, attackers do not rely on the stack for control flow instead relying merely on a sequence of indirect jump instructions to access gadgets. Both ROP and JOP techniques allow attackers arbitrary execution of gadgets in order to bypass the intended control flow of a program.

SUMMARY

According to an aspect of the present invention, there is a method, computer program product and/or system that performs the following operations (not necessarily in the following order): (i) one or more processors receive an indirect jump instruction comprising a target address offset and a maximal offset value; (ii) one or more processors determine whether the target address offset is valid by comparison of the target address offset and the maximal offset value; and (iii) one or more processors execute a jump operation based on whether the target address offset is valid. In some embodiments of the present invention, the jump operation comprises one or more processors executing an instruction located at a target address referenced by the target address offset if the target address offset is valid. In some embodiments, the jump operation further comprises one or more processors raising an exception if the target address offset is not valid.

DETAILED DESCRIPTION

Figure 1:
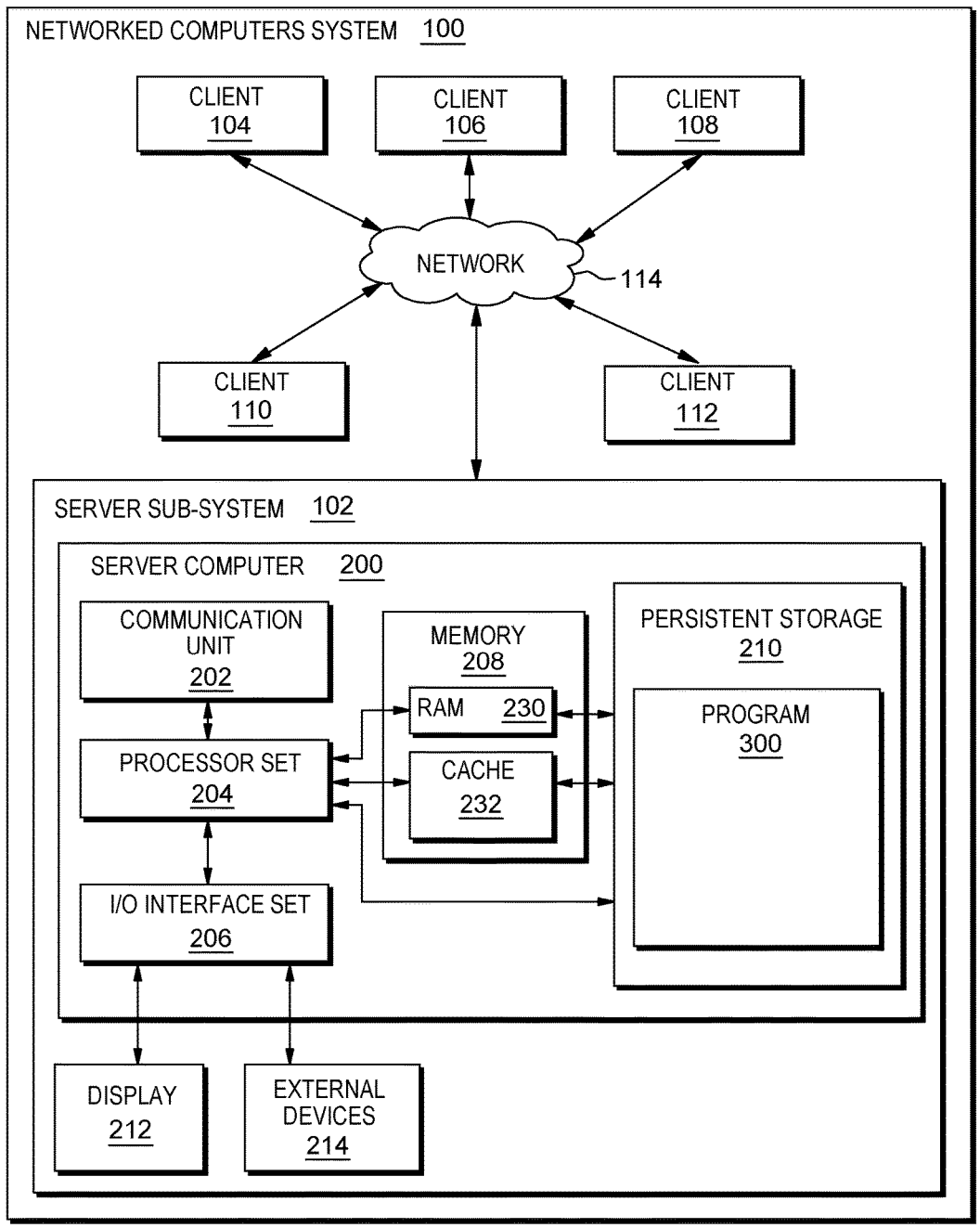
FIG. 1 is a block diagram view of a first embodiment of a system according to the present invention.

Code reuse attacks refer to those attacks where the attacker gains control of indirect branch target addresses to change the program control flow and execute instruction sequences (also referred to as "gadgets") that do not exist in the original program control flow. Chaining a series of gadgets together by jumping to the beginning of gadgets instead of the instructions of the original program control flow allows attackers to execute malicious code using existing program and/or library code. Embodiments of the present invention target code reuse attacks that exploit indirect branches that originally jump to addresses in a function to jump to gadgets anywhere in the program address space (also referred to as "indirect jumps"). These embodiments mitigate such code reuse attacks by restricting the permitted range of indirect jump instructions within a computer system. In this way, as will be discussed in further detail below, embodiments of the present invention can significantly restrict the number of gadgets accessible from an indirect jump, and thereby mitigate the potential damage that can be caused by the described code reuse attacks.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: sub-system 102; sub-systems 104, 106, 108, 110, 112; communication network 114; computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Figure 2A:
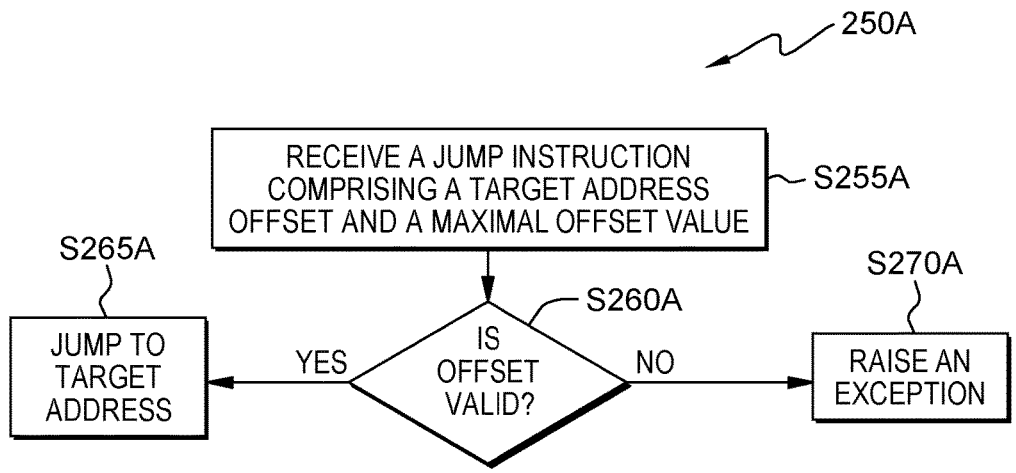
FIG. 2A is a flowchart showing a first embodiment method performed, at least in part, by the first embodiment system.
Figure 2B:
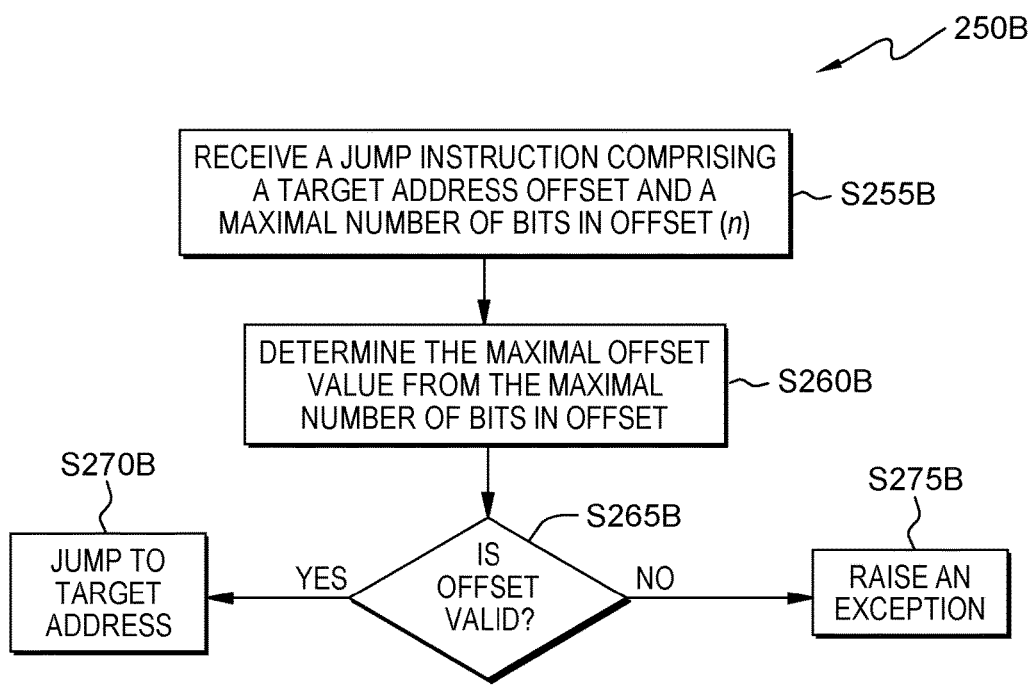
FIG. 2B is a flowchart showing an alternate embodiment method performed, at least in part, by the first embodiment system.
Figure 2C:
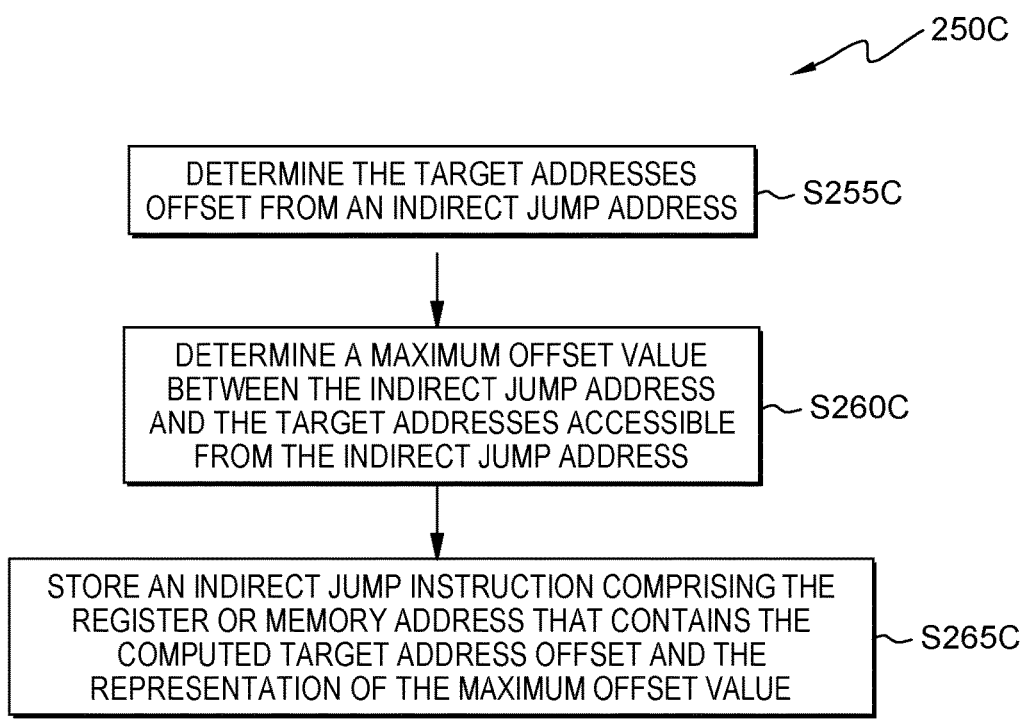
FIG. 2C is a flowchart showing another aspect of the present invention performed, at least in part, by the first embodiment system.
Figure 3:
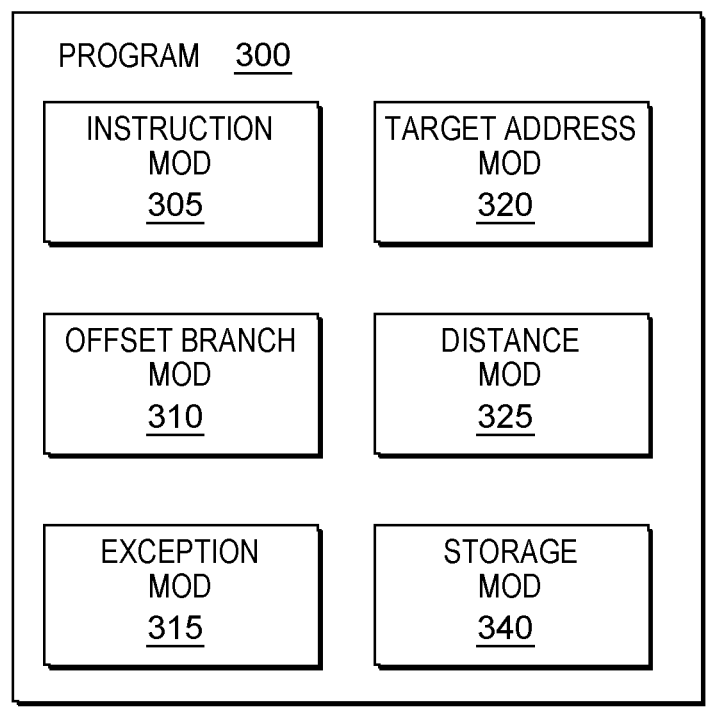
FIG. 3 is a block diagram showing a machine logic (for example, software) portion of the first embodiment system.

Processor set 204 may include a combination of electronic circuits (for example, combinations of semiconductor structures such as transistors, resistors, capacitors and the like that are organized into an electronic circuit that is configured to execute one or more of the processes described in the discussion of FIGS. 1-3) included in one or more integrated circuit chips. As such, the one or more integrated circuit chips are configured to execute at least a part of the processes described in the discussion of FIGS. 1-3. Integrated circuit chips may be incorporated as part of a computing system that is configured to execute at least a part of the processes described in the discussion of FIGS. 1-3.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

FIG. 2A shows flowchart 250A depicting a method according to the present invention. FIG. 2B shows flowchart S250B further depicting an aspect of flowchart 250A according to the present invention. FIG. 2C shows flowchart 250C depicting a method according to the present invention. FIG. 3 shows program 300 for performing at least some of the method operations of flowchart 250A and flowchart 250B. These methods and associated components will now be discussed, over the course of the following paragraphs, with extensive reference to FIG. 2A, FIG. 2B, FIG. 2C (for the method operation blocks), and FIG. 3 (for the software blocks).

In code reuse attacks, the attacker gains control of indirect branch target addresses to change the program control flow and execute instruction sequences. The indirect branch target address is modified to point to a gadget address in an existing program and/or library code by exploitation of one or more memory corruption vulnerabilities. When chained together sequentially, these gadgets allow an attacker to execute malicious code using existing program and/or library code.

Some embodiments of the present invention, mitigate jump oriented programming attacks by restricting the range of indirect jump target addresses and, therefore, significantly restricting the number of gadgets accessible from an indirect jump. Some embodiments mitigate code reuse attacks by restricting the addresses that can be accessed from an indirect jump to a maximum offset from a current instruction address. These and other embodiments raise an exception if the indirect jump instruction receives an address that is out of the permitted boundaries.

Referring to flowchart 250A (see FIG. 2A), processing begins at operation S255A, where an instruction module ("mod") 305 (see FIG. 3) receives an indirect jump instruction comprising a target address offset and a maximal offset value. This indirect jump instruction is intended to introduce a new type of indirect branch that restricts the range of the branch target addresses. Reducing the range of branch target addresses significantly restricts the number of gadgets accessible from indirect jumps. This objective is achieved by determining whether the target address is within the range of legal branch target addresses. The jump instruction may receive a first parameter corresponding to a target address offset from a branch instruction address. In some embodiments of the present invention, this target address offset is stored in a register (e.g., register R6).

The jump instruction further receives a second parameter corresponding to a maximal offset value. In some embodiments of the present invention, the maximal offset value may specify the target address offset farthest from the current instruction address allowed by the indirect jump instruction. For example, given an instruction jmp R6, 0C04, the target address offset in R6 may only be between zero and the value 0C04 to be valid (e.g., R6 is valid only if 0<=R6<=0C04). All the numbers in the examples are 16-bits and negative number are in two's complement representation. In other embodiments, the jump instruction may jump to negative offset and the target address offset in R6 may only be between zero and the value F3FC to be valid (e.g., R6 is valid only if 0>=R6=>F3FC). These aspects of the invention are discussed in more detail, below, in the Further Comments and/or Embodiments sub-section of this Detailed Description.

Processing continues at operation S260A (see FIG. 2A), where an offset branch module 310 (see FIG. 3) determines whether the target address offset is valid by determining that the target address offset is between 0 and the maximal offset value as discussed in more detail, below, in the Further Comments and/or Embodiments sub-section of this Detailed Description.

In some embodiments of the present invention, the target address offset is determined to be valid if it is between zero and the maximal offset value. If the target address offset is valid (operation S260A, "yes" branch), processing continues at operation S265A. In some embodiments, the target address offset is determined to be invalid (i.e., out of range) if the target address offset is not between zero and the maximal offset value. If the target address offset is not valid (operation S260A, "no" branch), processing continues at operation S270A.

At operation S265A (see FIG. 2A), the offset branch module 310 performs a relative indirect branch to continue program control flow at the address referenced by the target address offset. In some embodiments of the present invention, the offset branch module 310 may calculate a target address based on the target address offset and continue execution of the program at the target address.

At operation S270A (see FIG. 2A), exception module 315 (see FIG. 3) raises an exception if the target address offset is not valid. In some embodiments of the present invention, exception module 315 may raise an exception. In these and other embodiments, exceptions may further be classified as a fault, trap, or abort exceptions. In some embodiments, the exception may result in the halt of execution of the compromised program in order to protect the system from malicious code.

Referring to flowchart 250B (see FIG. 2B), processing begins at operation S255B, where an instruction module ("mod") 305 (see FIG. 3) receives an indirect jump instruction comprising a target address offset and a maximal number of bits (n). Specifying the maximal number of bits (n) is advantageous in the case that there is no sufficient space in the instruction to specify a maximal offset value. For example, given an instruction jmp R6, 7, where R6 is a 16-bit register, the target address offset in R6 may only set or specify up to seven (7) bits for the address to be valid (e.g., R6=0000000001100001 is valid while R6=0000000011100001 is not valid). In some embodiments of the present invention, the maximal number of bits refers to the least significant bits of the target address offset. In other embodiments of the present invention, the indirect jump instruction may support negative offset values. In these embodiments, the indirect jump instruction may comprise a target address offset, a negative offset field, and a maximal offset value.

Processing proceeds at operation S260B (see FIG. 2B), where the offset branch module 310 determines the maximal offset value from the maximal number of bits. In some embodiments of the present invention, the maximal offset value is obtained by setting the n least significant bits to one (1) and the rest of the bits to zero (0). Continuing with the above example, given an instruction jmp R6, 7, where R6 is a 16-bit register, the maximal offset value may be obtained by setting the seven (7) least significant bits to one (1) and the rest of the bits to zero (0) (e.g., maximal offset value=0000000001111111).

Processing continues at operation S265B (see FIG. 2B), where an offset branch module 310 (see FIG. 3) determines whether the target address offset is valid by comparison of the target address offset and the maximal offset value. In some embodiments of the present invention, comparison of the target address offset and the maximal offset value may be performed by bitwise operations between the target address offset and the maximal offset value. In some embodiments of the present invention, a bitwise-not operation is performed on the maximal offset value. In these embodiments, a bitwise-and operation is performed between the target address offset and the result of the bitwise-not operation on the maximal offset value. In other embodiments, a bitwise-and operation is performed between the target address offset and the maximal offset value without computing the bitwise-not operation on the maximal offset value (e.g., when the instruction includes a negative offset field).

In some embodiments of the present invention, the target address offset is determined to be valid if the result of the bitwise-and operation between the target address offset and the result of the bitwise-not operation on the maximal offset value is zero (0). In other embodiments, the target address offset is determined to be valid if the result of the bitwise-and operation and the maximal offset value is equal to the maximal offset value (e.g., when the instruction includes a negative offset field). In yet other embodiments, when the instruction includes a positive-and-negative offset field, the offset branch module 310 performs a comparison based on a positive target address offset (e.g., bitwise-and operation between the target address offset and the result of the bitwise-not operation on the maximal offset value) and, if the result is not valid, the offset branch module performs a comparison based on a negative target address offset (e.g., bitwise-and operation between the target address offset and the maximal offset value). In these and other embodiments, the target address offset is determined to be valid if the result of one of the comparisons is valid. Conversely, in these and other embodiments, the target address offset is determined to be invalid if the result of both comparisons are invalid.

If the target address offset is valid (operation S265B, "yes" branch), processing continues at operation S270B. In some embodiments, the target address offset is determined to be invalid (i.e., out of range) if the result of the bitwise-and operation between the target address offset and the result of the bitwise-not operation on the maximal offset value is different than zero (0). If the target address offset is not valid (operation S265B, "no" branch), processing continues at operation S275B. These aspects of the invention are discussed in more detail, below, in the Further Comments and/or Embodiments sub-section of this Detailed Description.

At operation S270B (see FIG. 2B), the offset branch module 310 performs a relative indirect branch to continue program control flow at the address referenced by the target address offset. In some embodiments of the present invention, the offset branch module 310 may calculate a target address based on the target address offset and continue execution of the program at the target address.

At operation S275B (see FIG. 2B), exception module 315 (see FIG. 3) raises an exception if the target address offset is not valid. In some embodiments of the present invention, exception module 315 may raise an exception. In these and other embodiments, exceptions may further be classified as a fault, trap, or abort exceptions. In some embodiments, the exception may result in the halt of execution of the compromised program in order to protect the system from malicious code.

Referring now to FIG. 2C, processing begins at operation S255C, where a target address module 320 (see FIG. 3) determines one or more target addresses offset from an indirect jump address. For example, a target address module 320 may read a block of code (e.g., a switch statement) to determine one or more target addresses relative to a branch instruction.

Processing continues at operation S260C, where a distance module 325 (see FIG. 3) determines a maximal offset value between the indirect jump address and the target addresses accessible from the indirect jump address. In some embodiments of the present invention, the maximal offset value may specify the target address farthest from the current indirect jump address (see FIG. 2A) or may represent the maximum number of bits that may be set in the target address offset (see FIG. 2B).

Processing continues at operation S265C, where a storage module 330 stores a jump instruction comprising the register or memory address that contains the computed target address offset and the representation of the maximal offset value. In some embodiments of the present invention, the storage module 340 writes the jump instruction to memory. The jump instruction may be written to memory 208 (non-persistent) or persistent memory 210.

III. Further Comments and/or Embodiments

Some embodiments of the present invention introduce a new type of indirect branch that restricts the range of the branch target addresses and therefore restricts significantly the number of gadgets accessible from an indirect jump. This technique is referred to herein as a "restrictive relative indirect branch." Some embodiments of the present invention provide lower overhead methods to reduce the number of available gadgets to code reuse attacks that use indirect jump.

A purpose of some embodiments of the present invention is code reuse attack mitigation. Indirect branches can be used to jump to any address in the executable memory. Code reuse attacked are based on indirect branches divided to: indirect branch to function entry, return from function, and indirect branch to target inside a function. Some embodiments of the present invention address indirect branch to target inside a function by providing a new instruction to lower Control Flow Integrity (CFI) checks overhead.

A relative branch refers to a target address offset from a current instruction address. An indirect branch refers to a target address specified in register or memory address. Embodiments of the present invention include a relative indirect branch that restricts the target address offset from a branch instruction. A register/address holds the offset from the current instruction address as opposed to the full target address. In some embodiments of the present invention, the instruction receives a first parameter corresponding to the register/address that holds the target address offset and a second parameter corresponding to the maximal offset value. In other embodiments, the instruction receives a first parameter corresponding to the register/address that holds the target address offset and a second parameter corresponding to the maximal number of bits from which the maximal offset value may be obtained. The maximal offset value or the number of bits represent the maximal offset value from the current instruction address must be protected to ensure that an attacker cannot override the maximal offset value. In some embodiments, this maximal offset value may be an immediate value in the instruction. The purpose of the maximal offset value is to restrict the access only as far as the last target and therefore reduce the number of available gadgets.

In some embodiments, to calculate the target address of the branch, the program adds the offset specified in a register to the branch instruction address. The new restrictive relative indirect branch instruction also restricts the number of bits that are used to specify the offset and therefore restricts the number of available gadgets. The number of bits should be set based on the maximum bits required to specify the branch target offset with the maximal relative distance.

The restrictive relative indirect branch instruction (also referred to as simply "the instruction" or "the new instruction") is similar to an indirect branch and therefore it may include other options or extensions available for regular indirect branch. The instruction holds information on the register or memory location to be used. However, in this instruction the specified register or memory location holds the offset (relative address) from the current branch instruction address. The new instruction also specifies the number of bits to use to specify the maximum offset value or the maximal offset value, preferably within the instruction itself or in a different secured method. The offset could also be negative (but this is not a requirement). A specific implementation can choose whether signed offsets (negative offsets) are supported; and, if signed offsets are supported, which bit/s represent the sign.

Compilers, users, or other tools that generate this instruction can locate the branch targets near the branch instruction and specify the number of bits to use to restrict the access only as far as the last target.

In an exemplary embodiment, a program contains the instruction jmp R6, FF80, where the target address offset in R6 is valid only if it is between zero and the value FF80 (e.g., R6 is valid only if 0>=R6>=FF80). In these and other embodiments, the offset may be negative and the comparison may be performed by determining whether the target address offset is between zero and the maximal offset value. In yet other embodiments, in some processors with fixed instruction size one can save space in the instruction when saving the number of bits in maximal offset value. For example, in processor with 32 bits fixed instruction size the instruction address always end with 00. Therefore, the number of bits in maximal offset value can be specified using (number of bits—2) and the processor can add to the generated maximal offset value offset two bits automatically.

In another exemplary embodiment, a program contains the instruction jmp R6, 7 where R6 is a 16-bit address relative to the current branch instruction address (e.g., R6=0000000010001100) and the maximal offset value from the indirect jump is given by 7 bits (e.g., maximal offset value is 0000000001111111 and after bitwise-not it is 1111111110000000). The register R6 and the bitwise-not of the maximal offset value may be compared using a bitwise-and operation. In some embodiments of the present invention, the instruction may raise an exception if the result of the bitwise-and operation is not equal to zero (0). For example, given R6=0000000000001100, the bitwise-and operation is equal to zero (e.g., 0000000000001100 & 1111111110000000=0) meaning that the address at R6 is a legitimate relative indirect branch target instruction. Therefore, the processor performs the jump operation and execution continues at the target address (e.g., current instruction+R6). In another example, given R6=0000000010001100, the bitwise-and operation is not equal to zero (e.g., 0000000010001100 & 1111111110000000=0000000010000000) meaning that the address is not a legitimate relative indirect branch target instruction. Therefore, the processor raises a runtime exception and execution is halted to protect the system against further code reuse attacks. This instruction can be combined with other checks and exceptions for code reuse attacks without departing from the spirit of this invention.

In yet another exemplary embodiment, a program contains the instruction jmp R6, neg, 7, where R6 is a 16-bit address relative to the current branch instruction address (e.g., R6=1111111100101100) and the maximal offset value from the indirect jump is a negative offset value in two's complement format given by 7 bits. The maximal offset value may be obtained by setting the seven (7) least significant bits to zero (0) and the rest of the bits to one (1) (e.g., maximal offset value=1111111110000000). In this embodiment, the register R6 and the maximal offset value may be compared using a bitwise-and operation. In some embodiments of the present invention, the instruction may raise an exception if the result of the bitwise-and operation is not equal to the maximal offset value. For example, given R6=1111111110001100, the bitwise-and operation is equal to the maximal offset value (e.g., 1111111110001100 & 1111111110000000=1111111110000000) meaning that the address at R6 is a legitimate relative indirect branch target instruction. Therefore, the processor performs the jump operation and execution continues at the target address (e.g., current instruction+R6). In another example, given R6=1111111100001100, the bitwise-and operation is not equal to the maximal offset value (e.g., 1111111100001100 & 1111111110000000 !=1111111110000000) meaning that the address is not a legitimate relative indirect branch target instruction. Therefore, the processor raises a runtime exception and execution is halted to protect the system against further code reuse attacks.

This instruction can be combined with other indirect branch and relative branch instruction types and extensions, for example: conditional and unconditional branch, instructions that specify the register in the instruction opcode (in bcctr the register ctr is specified by the instruction opcode), among others. In a processor having fixed instruction size, the instruction can save space by using the number of bits in the maximal offset value. For example, in a processor having fixed instruction size of 32-bits, the instruction address always end with 00. Therefore, the number of bits in the maximal offset value can be specified using less bits (e.g., number of bits—2) and the processor can add two (2) bits to the generated maximal offset value offset automatically. In another variation, the instruction may include signed offset addresses (positive and/or negative offset addresses). In still another variation, the maximal offset can be secured by defining it as an immediate value of the instruction or by any other suitable secure method.

Some embodiments of the present invention disclose an apparatus including a circuit configured to receive a jump instruction comprising a target address and a maximal offset value. These and other embodiments may include a circuit configured to determine whether the target address is valid by comparison of the target address and the maximal offset value. Still other embodiments may further include a circuit configured to raise an invalid target address exception responsive to determining the target address is not valid.

Some embodiments of the present invention further disclose a method, computer program product, and system that performs the following operation (not necessarily in that order): (i) determining one or more target addresses accessible from an indirect jump address; (ii) determining a maximal offset value between the indirect jump address and the target addresses accessible from the indirect jump address; and (iii) storing, by one or more processors, an indirect jump instruction comprising a target address offset and the maximal offset value.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method, comprising:
receiving, by one or more processors, a first indirect jump instruction comprising a first target address offset and a first maximal offset value;
determining, by one or more processors, whether the first target address offset is valid by comparison of the first target address offset and the first maximal offset value;
determining, by one or more processors, the first target address offset is valid if the target address offset is between zero and the first maximal offset value;
executing, by one or more processors, a first jump operation based on whether the first target address offset is valid, wherein the first jump operation comprises executing an instruction located at a first target address referenced by the first target address offset if the first target address offset is valid, and wherein the first jump operation comprises raising a first exception if the first target address offset is not valid;
receiving, by one or more processors, a second indirect jump instruction comprising a second target address offset and a first maximal number of bits;
determining, by one or more processors, a second maximal offset value by setting a set of bits corresponding to the first maximal number of bits to one and the rest of the bits to zero;
determining, by one or more processors, the target address offset is valid if the result of a bitwise-and operation between: (i) the second target address offset, and (ii) the bitwise-not of the second maximal offset value, is equal to zero;
executing, by one or more processors, a second jump operation based on whether the second target address offset is valid, wherein the second jump operation comprises executing an instruction located at a second target address referenced by the second target address offset if the second target address offset is valid, and wherein the second jump operation comprises raising a second exception if the second target address offset is not valid;
receiving, by one or more processors, an indirect jump instruction comprising a third target address offset and a second maximal number of bits;
determining, by one or more processors, a third maximal offset value by setting a set of bits corresponding to the second maximal number of bits to zero and the rest of the bits to one;
determining, by one or more processors, the third target address offset is valid if the result of a bitwise-and operation between: (i) the third target address offset, and (ii) the third maximal offset value, is equal to the third maximal offset value; and
executing, by one or more processors, a third jump operation based on whether the third target address offset is valid, wherein the third jump operation comprises executing an instruction located at a third target address referenced by the third target address offset if the third target address offset is valid, and wherein the third jump operation comprises raising a third exception if the third target address offset is not valid,
wherein the first maximal offset value, the second maximal offset value, and the third maximal offset value are: (i) protected by a memory access control, (ii) protected by encryption, and (iii) immediate values, and
wherein the first exception, the second exception, and the third exception are selected from the group consisting of: a fault exception, a trap exception, and an abort exception.

* * * * *